(12) United States Patent
Zhang et al.

(10) Patent No.: US 9,821,743 B2
(45) Date of Patent: Nov. 21, 2017

(54) SYSTEM AND METHOD TO ALERT VEHICLE DOOR-OPENING

(71) Applicant: FORD GLOBAL TECHNOLOGIES, LLC, Dearborn, MI (US)

(72) Inventors: Kadin Zhang, Nanjing (CN); Yong Zheng, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/161,612

(22) Filed: May 23, 2016

(65) Prior Publication Data
US 2017/0021759 A1 Jan. 26, 2017

(30) Foreign Application Priority Data
Jul. 24, 2015 (CN) .......................... 2015 1 0441063

(51) Int. Cl.
| | | |
|---|---|---|
| *B60Q 1/22* | (2006.01) | |
| *B60R 21/0132* | (2006.01) | |
| *B60Q 1/26* | (2006.01) | |
| *B60Q 1/32* | (2006.01) | |
| *B60Q 1/52* | (2006.01) | |
| *B60R 16/02* | (2006.01) | |
| *B60R 21/0134* | (2006.01) | |

(52) U.S. Cl.
CPC ........ *B60R 21/0132* (2013.01); *B60Q 1/2692* (2013.01); *B60Q 1/32* (2013.01); *B60Q 1/525* (2013.01); *B60R 16/02* (2013.01); *B60R 21/0134* (2013.01)

(58) Field of Classification Search
CPC .......... B60Q 1/50; B60Q 1/2655; B60Q 1/38; B60Q 1/323

USPC ................ 340/463, 464, 468, 469, 471, 472
See application file for complete search history.

(56) References Cited

U.S. PATENT DOCUMENTS

| | | | |
|---|---|---|---|
| 4,965,546 A | | 10/1990 | Chang |
| 5,871,275 A | * | 2/1999 | O'Farrell ................. B60Q 1/22 |
| | | | 362/144 |
| 7,068,160 B2 | | 6/2006 | Tourneur et al. |
| 8,963,701 B2 | * | 2/2015 | Rodriguez Barros ................. B60Q 1/2665 |
| | | | 340/438 |
| 9,403,475 B2 | * | 8/2016 | Cheng ................. B60Q 1/2665 |
| 9,487,126 B2 | * | 11/2016 | Salter ....................... B60Q 1/24 |
| 9,541,629 B2 | * | 1/2017 | Kim ...................... G01C 21/165 |
| 2007/0057780 A1 | | 3/2007 | Bridges et al. |
| 2015/0002288 A1 | * | 1/2015 | Lee ........................ B60Q 1/323 |
| | | | 340/471 |

FOREIGN PATENT DOCUMENTS

| | | |
|---|---|---|
| DE | 102005021142 | 11/2006 |
| FR | 2932734 | 12/2009 |

* cited by examiner

*Primary Examiner* — Toan N Pham
(74) *Attorney, Agent, or Firm* — Mohr Intellectual Property Law Solutions, PC

(57) ABSTRACT

In one or more embodiments, a door-opening alert system of a vehicle includes a light-emitting unit to be connected and at least partially external to the vehicle at a light-emitting position, a sensing unit to signal a door-opening event at the vehicle, and a control unit to communicate between the sensing unit and the light-emitting unit such that the light-emitting unit is to emit a light pattern indicative of a dimension of a side door of the vehicle.

20 Claims, 4 Drawing Sheets

SYSTEM AND METHOD TO ALERT VEHICLE DOOR-OPENING

RELATED APPLICATION(S)

This application claims the benefit of Chinese New Invention Patent Application No.: CN 201510441063.5, filed on Jul. 24, 2015, the entire contents thereof being incorporated herein by reference.

TECHNICAL FIELD

The present invention relates to a system and a method to alert vehicle door-opening, and particularly to a system and a method via which passing-by pedestrians, automotive and non-automotive vehicles may be alerted of a door-opening event at the vehicle.

BACKGROUND

When the vehicle is at a stop, the driver or the passenger may wish to open the vehicle door; however, such a door-opening event may be carried out with oversight of passing-by pedestrians, bikers or automobiles due to limited eyesight or insufficient lighting, such that harm may be imparted onto the pedestrians, bikers or automobile operators who have entered or are about to enter into the path over which the vehicle door is to be opened.

Certain existing technologies employ the use of vehicle onboard facilities such as vehicle lights or speakers to alert the passing-by pedestrians with warning signals. By way of example, U.S. Pat. No. 4,965,546 discloses a warning device to provide alerts to passing-by pedestrians prior to the door being opened, where the warning device uses warning lights coming from existing onboard devices such as front and rear turning lights, side signal lights or brake lights.

SUMMARY

In one aspect, a door-opening alert system of a vehicle includes a light-emitting unit to be connected to the vehicle, a sensing unit to signal a door-opening event at the vehicle, and a control unit to communicate between the sensing unit and the light-emitting unit such that the light-emitting unit is to emit a light pattern indicative of a dimension of a side door of the vehicle.

The door-opening alert system may further include a connector via which at least a portion of the light-emitting unit is to be connected to a rearview mirror of the vehicle, to be connected to a roof-side rim of the vehicle, or to be connected to a lower body edge of the vehicle.

The door-opening alert system may further include a telescopic arm or a retractable arm via which at least a portion of the light-emitting unit is to be positioned externally to the vehicle at a light-emitting position.

The door-opening alert system may further include a direction adaptor via which at least a portion of the light-emitting unit is to emit light directed toward a ground surface upon which the vehicle stands.

Of the door-opening alert system, the light-emitting unit may further include an array of lights to form on the ground surface a light pattern indicative of an outer contour of a side door of the vehicle at a light-emitting position.

Of the door-opening alert system, the light-emitting unit may further include a lens to form on the ground surface a light pattern indicative of an outer contour of a side door of the vehicle at a light-emitting position.

Of the door-opening alert system, the light-emitting unit may further include an array of lights to form on the ground surface a light pattern indicative of an opening movement of a side door of the vehicle at a light-emitting position.

In another aspect, a method of alerting a door-opening event at a vehicle includes providing a door-opening alert system to the vehicle, the door-opening alert system including a light-emitting unit to be connected to the vehicle, a sensing unit to signal a door-opening event at the vehicle, and a control unit to communicate between the sensing unit and the light-emitting unit such that the light-emitting unit is to emit a light pattern indicative of a dimension of a side door of the vehicle.

Of the method, the door-opening alert system may be provided to include a connector via which at least a portion of the light-emitting unit is to be connected to a rearview mirror, a roof-side rim, a bottom portion or a lower body of the vehicle.

Of the method, the door-opening alert system may be provided to include a telescopic arm or a retractable arm via which at least a portion of the light-emitting unit is to be positioned externally to the vehicle at a light-emitting position.

Of the method, the door-opening alert system may be provided to include a direction adaptor via which at least a portion of the light-emitting unit is to emit light directed toward a ground surface upon which the vehicle stands.

Of the method, the door-opening alert system may be provided such that the light-emitting unit includes an array of lights to form on the ground surface a light pattern indicative of an outer contour of a side door of the vehicle at a light-emitting position.

Of the method, the door-opening alert system may be provided such that the light-emitting unit includes a lens to form on the ground surface a light pattern indicative of an outer contour of a side door of the vehicle at a light-emitting position.

Of the method, the door-opening alert system may be provided such that the light-emitting unit includes an array of lights to form on the ground surface a light pattern indicative of an opening movement of a side door of the vehicle at a light-emitting position.

DETAILED DESCRIPTION OF ONE OR MORE EMBODIMENTS

Figure 1A:
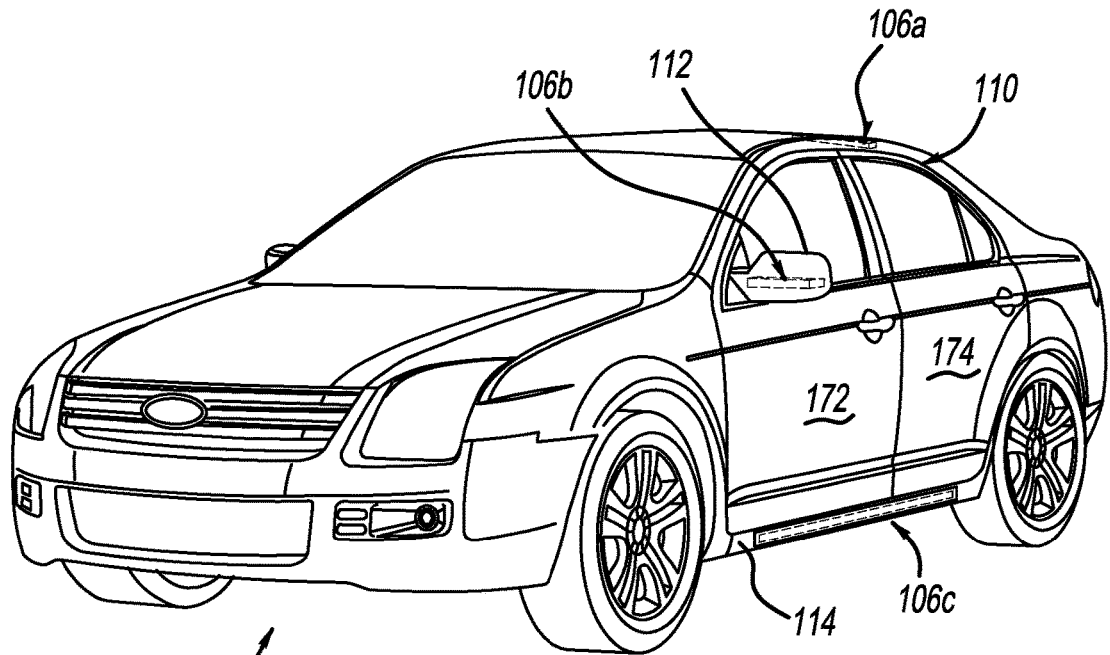
FIG. 1A illustratively depicts a perspective view of a vehicle with vehicle door-opening alert system according to one or more embodiments of the present invention.

As referenced in the FIG.s, the same reference numerals may be used herein to refer to the same parameters and components or their similar modifications and alternatives. These parameters and components are included as examples and are not meant to be limiting.

In one or more embodiments, and as detailed herein, the present invention is advantageous at least in providing quiet and friendly signals to passing-by pedestrians or bikers to alert them of a door-opening event at a nearby vehicle, where the alert system may be carried out via a light-emitting unit on the vehicle which is turned on by a determination that the door is to be or has been opened, and where the alert may be communicated before the vehicle door is to be opened or has been completely opened via light emitted onto the ground surface external to the vehicle and indicative of a maximum door opening path. Accordingly, the passing-by pedestrians and the bikers may choose their proceeding route well in advance while avoiding areas over which the vehicle door is to open, such that injuries or harm to the passing-by pedestrians or the bikers due to the door-opening event may be effectively avoided. In addition, the vehicle operator and the passenger may readily and straightforwardly determine the maximum area or path over which the door is to be opened. When the light pattern as formed on the ground surface is not disfigured, the vehicle door may be opened to its maximum open position. However when the light pattern emitted from the light-emitting unit is disfigured due to for instance obstacles such as rocks or fences along the road, the vehicle door may be opened into areas without such disfiguration of the light pattern.

Accordingly, the present invention in one or more embodiments is set apart from and advantageous over certain existing designs which employ the use of onboard devices such as lights and speakers to alert pedestrians of an incoming door-opening event. However, these alerting signals may make the pedestrians nervous and thus to respond with inappropriate or completely wrong reactions. In addition, even with awareness that the vehicle door is about to be opened, the pedestrian may still not be able to accurately determine to what extent the vehicle door is to be opened or whether the vehicle door is to be opened into the path where the pedestrian proceeds, and accordingly may produce excess yield or insufficient yield, where in the latter unnecessary injuries may be imparted onto the pedestrian.

In one or more embodiments, and further in view of FIG. 1A, FIG. 2A, FIG. 1B, FIG. 1C, FIG. 3 and FIG. 4, a vehicle door-opening alert system 400 is illustratively depicted in association with a vehicle 102, 202 or 302. The door-opening alert system 400 includes a sensing unit 402 to be in communication with a control unit 404, which in turn is to be in communication with a light-emitting unit 406. The light-emitting unit 406 may be of any suitable configurations, such as 106a and 206a illustratively depicted in FIG. 1A ad FIG. 2A, such as 106b and 206b illustratively depicted in FIG. 1A and FIG. 2A, and such as 106c and 306 illustratively depicted in FIG. 1A and FIG. 3.

Figure 4:
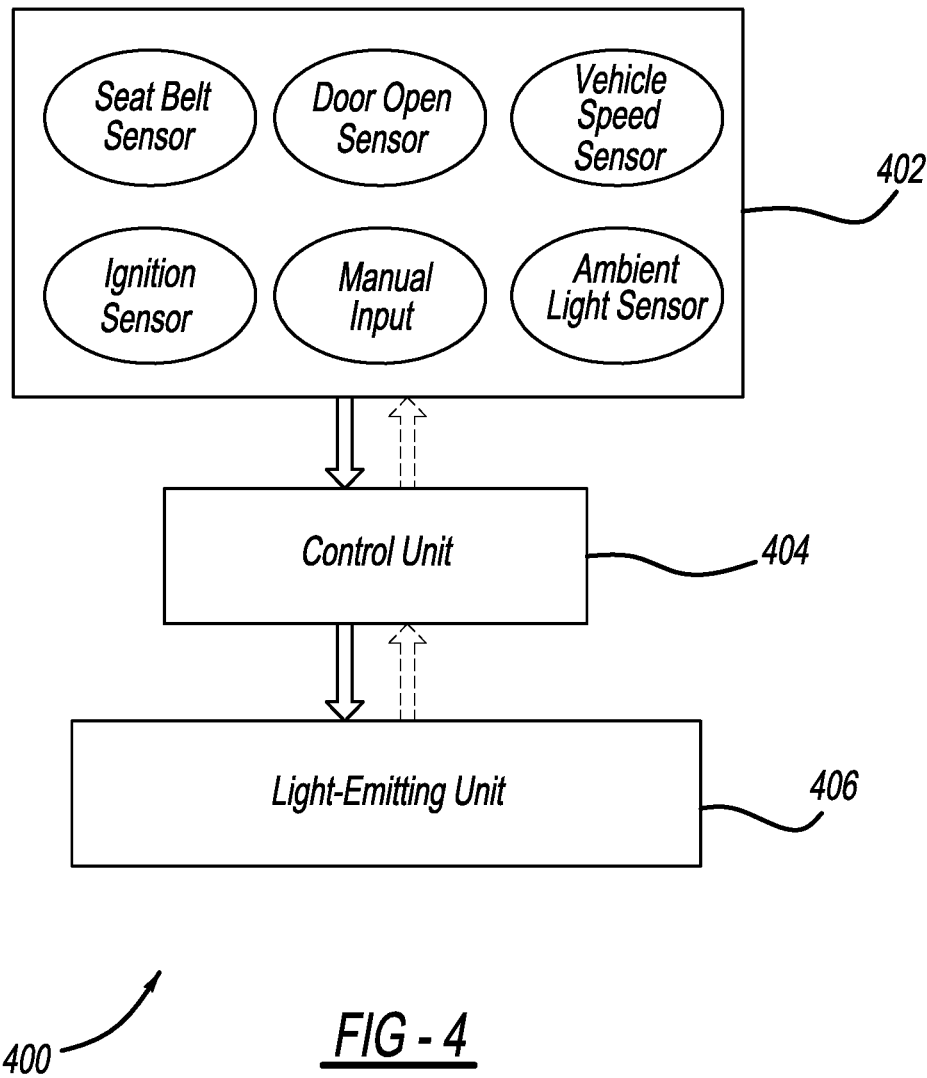
FIG. 4 illustratively depicts a control logic diagram of the vehicle door-opening alert system referenced in FIG. 1A, FIG. 1B, FIG. 1C, FIG. 2A, FIG. 2B and/or FIG. 3.

Referring back to FIG. 1A, the light-emitting unit 106b as a non-limiting example of the light-emitting unit 406 referenced in FIG. 4 may be positioned at a rearview mirror 112 of the vehicle 102. In certain other embodiments, the light-emitting unit 106a as a non-limiting example of the light-emitting unit 406 referenced in FIG. 4 may be positioned at a roof-side rim 110 of the vehicle. Alternatively, and further in view of FIG. 1A, the light-emitting unit 106c may be positioned on the vehicle 102 at a lower body side 114 below a side door 172 and/or its adjacent side door 174, such that deployment and operation of the light-emitting unit 106c is not to interfere with the side doors 172, 174.

Although the light-emitting device 406 has been illustratively depicted as being located at the rearview mirror 112, the roof-side rim 110, and/or the lower body side 114, the light-emitting device 406 may be located at other suitable locations of the vehicle 102, 202, 302, with non-limiting examples thereof including the tail gate and the front bumper.

Referring back to FIG. 4, the light-emitting unit 406 may be in communication with the control unit 404, for instance, electrically and/or via Bluetooth connection, where whether the light-emitting unit 406 is to be turned on is controlled by the control unit 404. The control unit 404 may be a vehicle onboard control unit of the vehicle such as a vehicle microcontroller, and may also be an independent chip controller or other chip controller of the vehicle. The control unit 404 may be in communication with the sensing unit 402, for instance, electrically and/or via Bluetooth connection. The sensing unit 402 may be an independent sensor, or a sensor collectively formed within the vehicle. Such sensor may include and not be limited to safety belt sensors, engine ignition sensors, vehicle gear position sensors, vehicle door opening sensors and vehicle speed sensors. The control unit determines whether a door-opening event is to occur based on the signals from the sensing unit.

In certain instances, the sensing unit 402 may include a sensor responsive to a manual input from the vehicle operator, such as a sensor responsive to a finger contact from the vehicle operator. In this scenario, the vehicle operator may desire, under certain instances, to send an alert to the surroundings. For instance, the vehicle operator may wish to alert the motorcyclist and the bicyclist following behind to certain adverse road conditions on their sides. Accordingly, the vehicle operator may manually activate the sensor and initiate the light-emitting.

Referring back to FIG. 4, the sensing unit 402 may continuously monitor basics of the vehicle 102, 202 or 302, and may emit signals to the control unit 404. The control unit 404 determines whether a vehicle door-opening event is to occur based on the signals from the sensing unit 402. In one or more embodiments, and when the control unit 404 receives signals indicating that one or more vehicle doors are about to be opened, such as when vehicle deceleration is detected at a vehicle speed sensor, when a vehicle engine ignition flameout is detected at a vehicle engine ignition sensor, when a vehicle position of being at a neutral or parking gear is detected at a vehicle gear sensor, when a release of the vehicle safety belt is detected at a safety belt sensor, or when a touch or an opening of the door handle by the driver is detected at a vehicle door opening sensor, the control unit 404 determines that a door-opening event is to occur and to accordingly signal the light-emitting unit. Upon receiving the control signal from the control unit 404, the light-emitting unit 406 turns on the light-emitting mode, and to emit light corresponding to the vehicle door size and directed toward the ground surface near the vehicle door.

As mentioned herein elsewhere, light-emitting units 106b and 106a, as two non-limiting examples of the light-emitting unit 406, may be installed at locations of or be made integral to parts of the vehicles at the rearview mirror 112 and the roof-side rim 110, respectively, as referenced in FIG. 1A. At the light-emitting position, such as the position illustratively depicted in FIG. 1B and FIG. 1C, the light-emitting unit 106b, 106a may be spaced apart from the vehicle 102, and more particularly spaced apart from the rearview mirror 112 and the roof-side rim 110, with a distance D1 or D2. The distance D1 or D2 may be no less than 10 centimeters, 20 centimeters, 30 centimeters, 40 centimeters, or 50 centimeters.

Figure 2A:
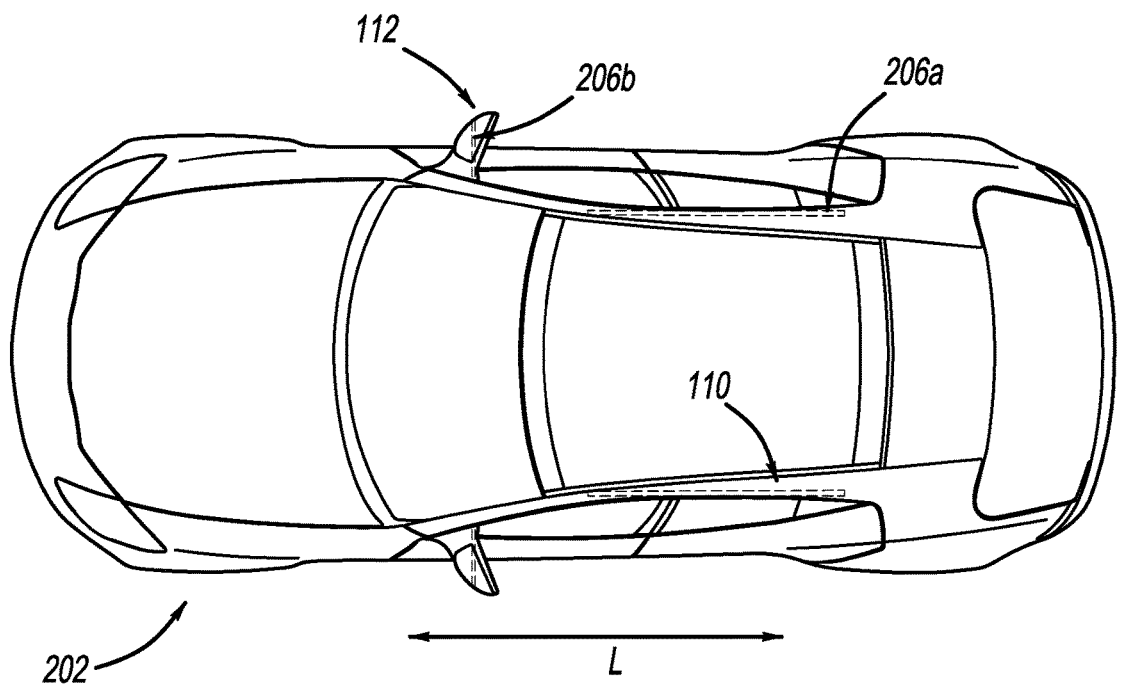
FIG. 2A illustratively depicts another perspective view of a top portion of the vehicle with the vehicle door-opening alert system referenced in FIG. 1A.
Figure 2B:
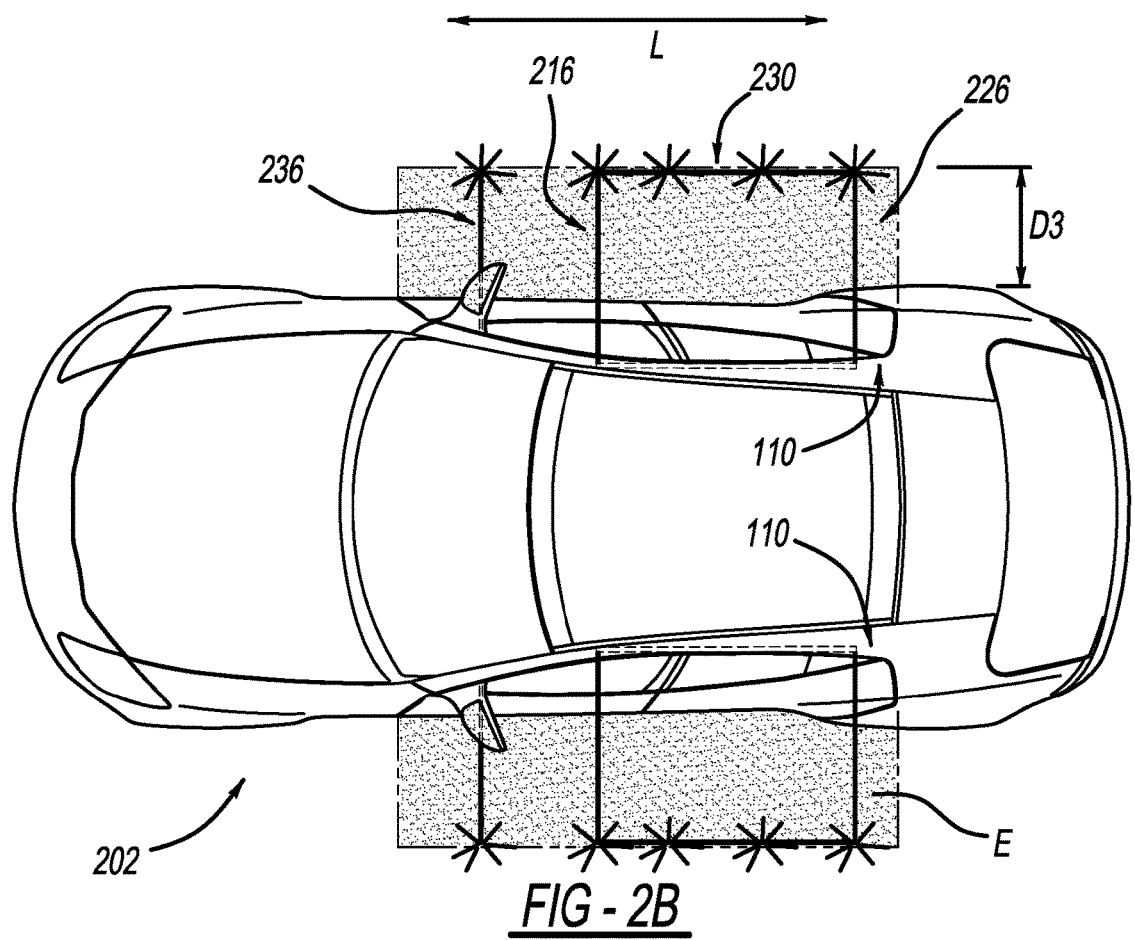
FIG. 2B illustratively depicts a top-down view of the vehicle with the door-opening alert system referenced in FIG. 2A, at a light-emitting position.
Figure 3:
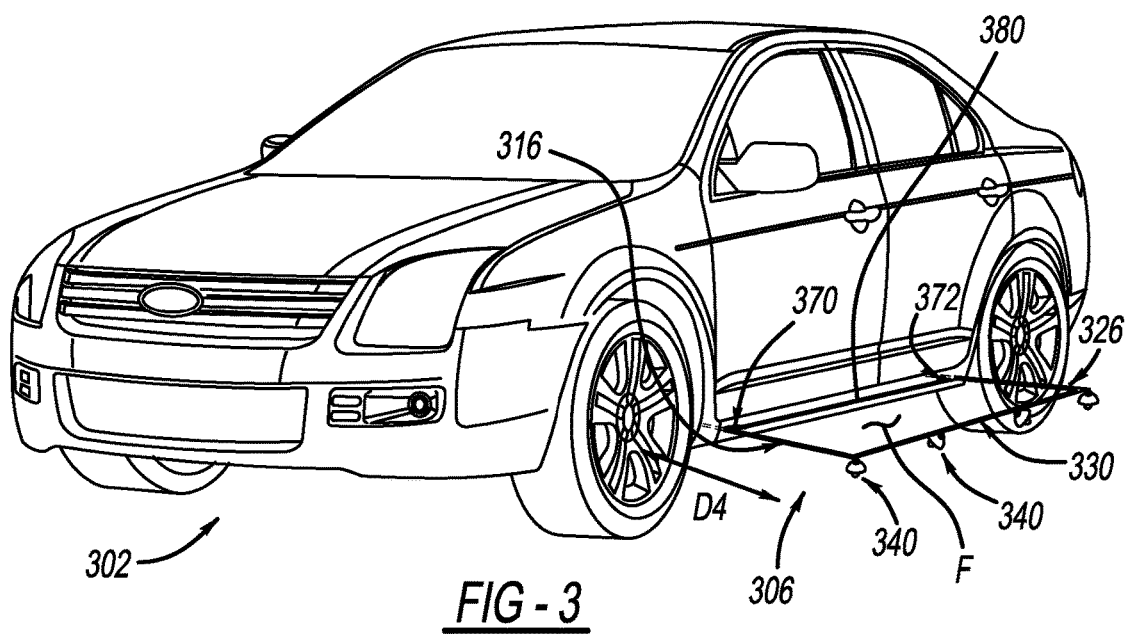
FIG. 3 illustratively depicts another perspective view of the vehicle with the vehicle door-opening alert system referenced in FIG. 1A.

Alternatively, light-emitting unit 206a as another non-limiting example of the light-emitting unit 406 may be positioned at the vehicle roof-side rim 110 and extend along the vehicle length direction L as illustratively depicted in FIG. 2A and FIG. 2B. At the light-emitting position such as the position illustratively depicted in FIG. 2B, the light-emitting unit 206a may extend out from the vehicle 202 and particularly from the roof-side rim 110 with a distance D3. The distance D3 may be no less than 10 centimeters, 20 centimeters, 30 centimeters, 40 centimeters, or 50 centimeters.

Referring back to FIG. 2A, the light-emitting units 206a and 206b as two non-limiting examples of the light-emitting unit 406 referenced in FIG. 4 are illustrative depicted at their rest position. At the light-emitting position as illustratively depicted in FIG. 2B, the light-emitting unit 206b may extend outwardly via an actionable arm 236 such that light may be emitted therefrom to form at least a portion of the light pattern E which is of the distance D3 away from the rearview mirror 112. Similarly, the light-emitting unit 206a may extend outwardly via a support beam 230 and a pair of actionable arms 216, 226 supporting the support beam 230. In both scenarios, each one of the actionable arms 236, 216 and 226 may be foldable, retractable and/or telescopic. Similarly, the light-emitting unit 206a may also contribute to the light pattern E in portion or as a whole.

Figure 1B:
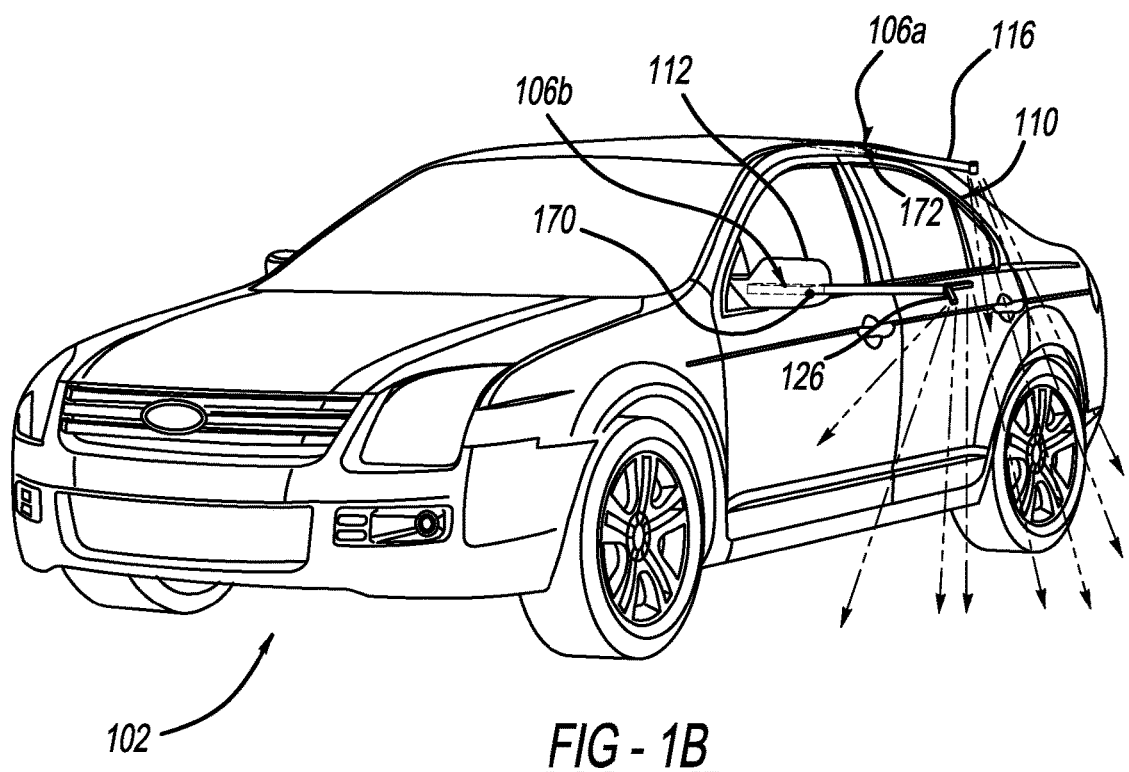
FIG. 1B illustratively depicts a perspective view of the vehicle with the door-opening alert system referenced in FIG. 1A, at a light-emitting position.

Additionally in certain embodiments, and as illustratively depicted in FIG. 1B, light-emitting unit 106b may be connected to the rearview mirror 112 via a connector 170 and may include an actionable arm 126. Similarly, the light-emitting unit 106a may be connected to the roof-side rim 110 via a connector 172 and may also include an actionable arm 116. Each of the actionable arms 116, 126 may be foldable, retractable and/or telescopic.

Actionable arm 116, 126 may be retractable like a monocular to position the light-emitting device of the light-emitting unit to extend to a suitable light-emitting location external to the vehicle, via a retractable arm. In addition, and alternatively, the actionable arms 116, 126 may be connected to an installation location at the rearview mirror 112 or the roof-side trim 110 via extendable and foldable arms. In structures where the retractable or foldable arms are used, the light-emitting unit 406 may further extend along a vehicle width direction W at an installation location on the roof-side trim 110, as illustratively depicted in FIG. 1B and FIG. 1C.

In addition, and as mentioned herein elsewhere, the light-emitting unit 106c as a non-limiting example of the light-emitting unit 406 may be positioned at a lower body side 114 of the vehicle body, as referenced in FIG. 1A. In certain embodiments, and further in view of FIG. 3 in particular, the light-emitting unit 106c may also be positioned at a foot step 380 of the vehicle, where the light-emitting unit 106c is employed via structural connectors 370, 372, and includes a support beam 330 extendable and retractable from the foot step 380 via a pair of actionable arms 316, 326, which again may be foldable, retractable and/or telescopic. In addition, one or more direction adaptors 340 may be positioned at and supported on the support beam 330 via which light may be emitted at various directions at a location that is apart from the foot step 380 via a distance D4.

In certain embodiments, the light-emitting unit 406 may include individual light emitters, such as light bulbs, light-emitting diodes, and laser generators. The light-emitting 406 may include a lens to form diagrams indicating an opening shape or size of a vehicle door, may include a direction adaptor to guide light emission, such as the direction adaptor 340 referenced in FIG. 3, or may include fibers or fiber refractors. The light emitting unit 406 may, via the lens or the direction adaptor, emit light with corresponding designs to be directed toward the ground surface near where the vehicle door is located, so as to form on the ground surface light patterns indicative of an actual area or path over which the door is to be opened, such as light pattern A and light pattern B depicted in FIG. 1C, light pattern E depicted in FIG. 2B, and light pattern F depicted in FIG. 3.

Each one of the connectors 170, 172, 370 and 372 may be of any suitable form, shape and configurations, with non-limiting examples thereof including sliding channels, hooks and clips.

Figure 1C:
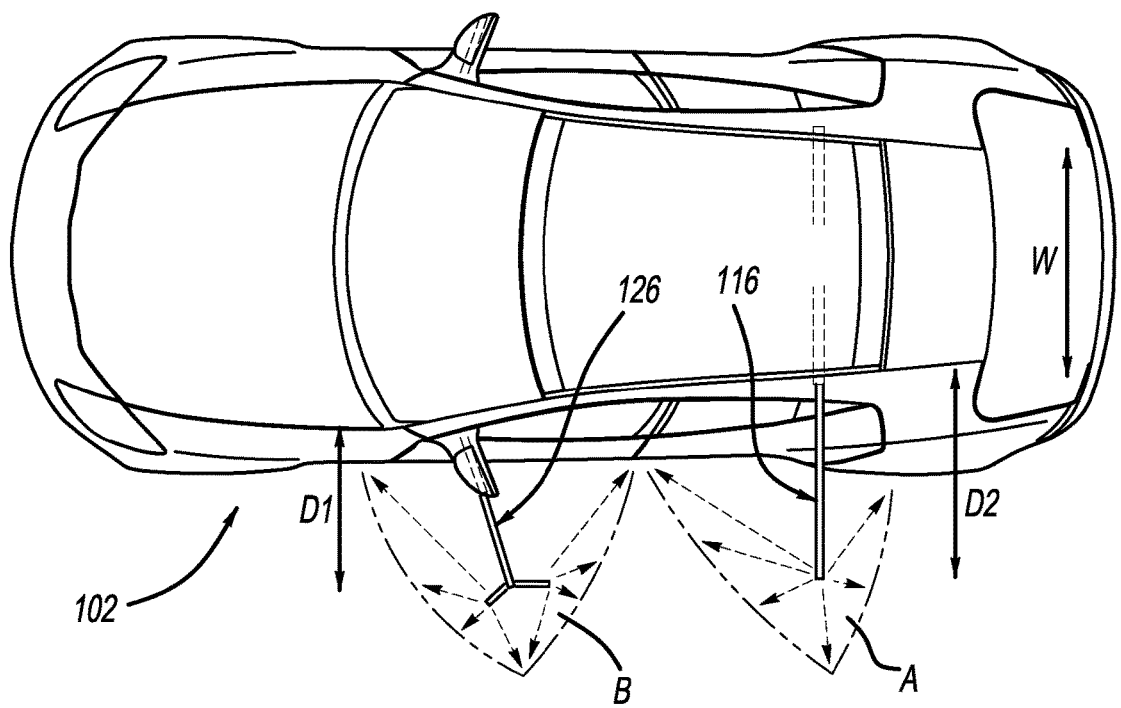
FIG. 1C illustratively depicts a perspective view of a top portion of the vehicle with the vehicle door-opening alert system referenced in FIG. 1B.

As indicated by the arrows shown in FIG. 1C, the light-emitting unit 406 may form on the ground surface a lighting pattern in partial circle or circular shape corresponding to the door-opening path; the lighting pattern may be of a polygon or an outline thereof corresponding to an area into which the door is to be opened, such as a rectangular or a trapezoid, as illustratively depicted in the shaded area of FIG. 2B; or further, the lighting pattern may include special diagrams such as manufacturer signs, notifying drawings or warnings (such as "caution," or arrows indicative of a vehicle door-opening direction).

In certain embodiments, the light-emitting unit 406 may further include a number of light-emitting devices, such as light-emitting diode panels, and laser panels, where the light-emitting unit may send out figure-forming lighting onto the ground surface via a collective arrangement and control of the number of the light-emitting devices. The figure-forming lighting may be of a quarter circle or an outline thereof indicative of a door-opening path, or of a polygon or an outline thereof indicative of an area into which the door is to be opened, such as a rectangular or a trapezoid. In addition, the light-emitting unit may further include a chip controller which may be integrated into the light-emitting unit or the control unit where, via a dynamic on and off control of each of the light-emitting devices via a predetermined lighting program, a dynamic lighting pattern may be formed onto the ground surface to indicate an area or an outline by which the vehicle door is to be opened. One experienced in the technical area may design a variety of dynamic lighting programs without having to depart from the scope of the present invention.

In one or more embodiments, the sensing unit 402 may further include a surrounding brightness sensor, where the control unit 404 compares the surrounding brightness signal to a predetermined value so as to determine if it is too dark in the surroundings. When it is determined that it is too dark in the surroundings, the control unit 404 may send control signals to the light-emitting unit to effect emission of light in a first color, such as lights in white or yellow, which is particularly suitable for lighting in the dark. When it is determined that it is bright enough in the surroundings, the control unit 404 may send out control signals to effect lighting in a second color, such as lighting in red or blue, which is particularly suitable for lighting in bright surroundings.

In one or more embodiments, the present invention as set forth herein is believed to have overcome challenges associated with certain existing technologies, by advantageously providing a door-open advance alert system for pedestrians.

However, one skilled in the art will readily recognize from such discussion, and from the accompanying drawings and claims that various changes, modifications and variations can be made therein without departing from the true spirit and fair scope of the invention as defined by the following claims.

What is claimed is:

1. A door-opening alert system of a vehicle, comprising:
   a light-emitting unit to be connected to the vehicle;
   a sensing unit to signal a door-opening event at the vehicle; and
   a control unit to communicate between the sensing unit and the light-emitting unit such that the light-emitting unit is to emit a light pattern on a ground adjacent to the vehicle indicative of an actual path over which a side door of the vehicle will open.

2. The door-opening alert system of claim 1, further comprising a connector via which at least a portion of the light-emitting unit is to be connected to a rearview mirror of the vehicle, an actionable arm connected to the connector and extending away from the rearview mirror at a traverse direction of the vehicle at a light-emitting position, and wherein the light-emitting unit is disposed at a distal end of the connector.

3. The door-opening alert system of claim 1, further comprising a connector via which at least a portion of the light-emitting unit is to be connected to a roof-side rim of the vehicle, an actionable arm connected to the connector and extending away from the roof-side rim of the vehicle at a light-emitting position, and wherein the light-emitting unit is disposed at a distal end of the connector.

4. The door-opening alert system of claim 1, further comprising a connector via which at least a portion of the light-emitting unit is to be connected to a lower body of the vehicle, an actionable arm connected to the connector and extending away from the lower body of the vehicle at a light-emitting position, and wherein the light-emitting unit is disposed at a distal end of the connector.

5. The door-opening alert system of claim 1, further comprising a telescopic arm or a retractable arm via which a light-emitting device of the light-emitting unit is to be positioned externally to the vehicle at a light-emitting position.

6. The door-opening alert system of claim 1, further comprising a direction adaptor via which at least a portion of the light-emitting unit is to emit light directed toward a ground surface upon which the vehicle stands.

7. The door-opening alert system of claim 1, wherein the light-emitting unit includes an array of lights to form on the ground surface a light pattern indicative of an outer contour of a side door of the vehicle at a light-emitting position.

8. The door-opening alert system of claim 1, wherein the light-emitting unit includes a lens to form on the ground surface a light pattern indicative of an outer contour of a side door of the vehicle at a light-emitting position.

9. The door-opening alert system of claim 1, wherein the light-emitting unit includes an array of lights to form on the ground surface a light pattern indicative of an opening movement of a side door of the vehicle at a light-emitting position.

10. The door-opening alert system of claim 1, wherein a distance of light-emitting unit includes a light-emitting device and a distance of the light-emitting device from the vehicle is no less than 10 centimeters at a light emitting position.

11. The door-opening alert system of claim 1, wherein the light pattern is in a partial circle, a circular shape, a rectangular or a trapezoid shape corresponding to a door-opening path.

12. The door-opening alert system of claim 1, wherein the light pattern includes a manufacturer sign, notifying drawings or warnings.

13. The door-opening alert system of claim 1, wherein the light-emitting unit includes at least one actionable arm extending away from the vehicle at a traverse direction, wherein the light-emitting unit is disposed at a distal end of the actionable arm at the light-emitting position.

14. A method of alerting a door-opening event at a vehicle, comprising:
   providing a door-opening alert system to the vehicle, the door-opening alert system including a light-emitting unit to be connected to the vehicle, a sensing unit to signal a door-opening event at the vehicle, and a control unit to communicate between the sensing unit and the light-emitting unit such that the light-emitting unit is to emit a light pattern on a ground immediately adjacent to the vehicle indicative of an actual path over which a side door of the vehicle will open.

15. The method of claim 14, wherein the door-opening alert system is provided to include at least one of a telescopic arm and a retractable arm via which at least a portion of the light-emitting unit is to be positioned externally to the vehicle at a light-emitting position.

16. The method of claim 14, wherein the door-opening alert system is provided to include a direction adaptor via which at least a portion of the light-emitting unit is to emit light directed toward a ground surface upon which the vehicle stands.

17. The method of claim 14, wherein the door-opening alert system is provided such that the light-emitting unit includes a lens to form on the ground surface a light pattern indicative of an outer contour of a side door of the vehicle at a light-emitting position.

18. A door-opening alert system of a vehicle, comprising:
   a light-emitting unit to be connected to the vehicle including
      an arm extending away from the vehicle at a light emitting position, and
      a light-emitting device disposed at a distal end of the arm;
   a sensing unit to signal a door-opening event at the vehicle; and
   a control unit to communicate between the sensing unit and the light-emitting unit such that the light-emitting unit is to emit a light pattern on a ground adjacent to the vehicle indicative of an actual path over which a side door of the vehicle will open.

19. The door-opening alert system of claim 18, wherein the arm includes a plurality of actionable arms, a support beam connected to distal ends of the actionable arms, and a light-emitting device disposed on the support beam, wherein each of the actionable arm is foldable, retractable or telescopic.

20. The door-opening alert system of claim 18, wherein the sensing unit further includes a surrounding brightness sensor, where the control unit compares a surrounding brightness signal to a predetermined value and sends control signals to the light-emitting unit to emit a light in a first color suitable for lighting in a dark surrounding if the dark surrounding is detected and a light in a second color suitable for lighting in a bright surroundings if the bright surrounding is detected.

\* \* \* \* \*